Patented May 4, 1948

2,440,899

UNITED STATES PATENT OFFICE 2,440,899

METHOD OF MAKING INSULATED AIRPLANE IGNITION SYSTEM CONDUCTORS

Mortimer T. Harvey, South Orange, N. J., assignor to The Harvel Corporation, a corporation of New Jersey No Drawing. Application May 6, 1943, Serial No. 485,883

3 Claims. (Cl. 18—59)

The present invention relates to novel methods for producing compositions of matter. In one of its more specific aspects the invention is directed to a novel method for producing compositions of matter finding particular application to the electrical insulation material for the conductors of the ignition system of airplanes and particularly those airplanes which travel at elevations above about 15,000 feet from the earth.

According to my invention, one of the specific aspects thereof is directed to the novel methods for producing combinations of a cellulose ether, a solid polymer of a vinyl acetal and a plasticizer. The cellulose ethers which are preferably employed are benzyl ether of cellulose and the alkyl ethers of cellulose, among which are the methyl, ethyl, propyl, etc., ethers of cellulose. Of the alkyl ethers, I prefer to employ ethyl cellulose. The ethyl ethers which best suit the main purpose of this invention are those whose ethoxy content is between about 42.5% and about 47%, although those having a higher or lower ethoxy content may be advantageously employed. In the practice of this invention a combination of two or more of the cellulose ethers may be employed or they may be used singly. The vinyl acetals employed are preferably vinyl formal, vinyl acetal and vinyl butyral. The solid polymers of said acetals may be employed singly or in combination of two or more of them. In addition to the cellulose ether and solid polymer of a vinyl acetal, there is employed a plasticizer. The plasticizer is one capable of plasticizing the cellulose ether and the solid polymerized vinyl acetal in the presence of each other, is not capable of being materially distilled over at temperatures as high as 200° C. and has an extremely low electrical conductivity characteristic. Among these plasticizers are chlorinated diphenyl or naphthalene, cardanol-formaldehyde intermediate resins, polymerized cashew nut shell liquid, polymerized cardanol, polymerized cardanol ethers, cashew nut shell ethers, polymerized cardanol esters, polyhydroxy polybasic acid reaction products, phosphates of phenols such as cresols, xylenols, etc., or their higher homologues, an illustrative example of which is tricresyl phosphate. One of the specific methods that may be employed for the preparation of said cardanol-formaldehyde intermediate resin plasticizers is to heat to boiling and maintain in the state of boiling under a reflux condenser a mixture of 640 pounds of cardanol, 110 pounds of an aqueous solution of formaldehyde (concentration 40% formaldehyde) and 9 pounds of an aqueous solution of ammonium hydroxide. Following this, the mass is heated at elevated temperatures up to 250° F. to dehydrate the mass and until the viscosity of the dehydrated mass is about 68 centipoises at 25° C. It is then strained through a 60 mesh copper screen to remove any lumps and the resultant product may be employed as said plasticizer. The polymeric plasticizers of cashew nut shell liquid, cardanol, cashew nut shell liquid ethers and esters, cardanol ethers and esters may be prepared by heating the respective materials at a temperature of about 350° F. in the presence of 2% to 5% diethyl sulfate until the viscosity thereof is between about 5,000 to 10,00 centipoises at 25° C. Other methods may be employed in the production of these polymeric plasticizers. These polymers as well as the cardanol-formaldehyde intermediate resin are capable of being heat hardened and maintaining that hardened state at room temperature. I prefer to use these plasticizers in their liquid stage which may vary from a thin liquid to a heavy viscous mass. These plasticizers may be employed alone or in combination of two or more and when a combination of two or more of them are used, I prefer that one of them be one that is capable of being heat hardened. My novel methods are employed with compositions of matter comprising cellulose ether, solid polymerized vinyl acetal and plasticizer, with these components present in varying proportions, but I prefer that they be present in the following limits: the ratio of the quantity by weight of cellulose ether to the quantity by weight of the vinyl acetal be between about 19 to 1 and 1 to 19 and the ratio of the sum of the weights of said cellulose ether and said acetal to the weight of the plasticizer be between about 4 to 1 and 1 to 2.

Said components in the aforesaid proportions are uniformly distributed with respect to each other to provide a substantially homogeneous mass which may be then treated in a number of different ways depending on its ultimate application. This homogeneous mass may be extruded and may be cured or heat hardened to provide a novel composition when in lengths of three or four feet and thickness of about 5 mm. is tough, flexible, non-brittle, bendable without cracking, can be wound around a cylinder of about 5 mm. without cracking, when used as an insulator with a conductor through the center thereof, will not lose its concentricity with respect to the conductor when bent.

Other advantages of this invention will in part be obvious and in part appear hereinafter and the invention accordingly comprises the several steps and relation of one or more of such steps with respect to each of the others, all of which will be exemplified in the following detailed disclosure, and the scope of the invention will be indicated in the claims.

For a fuller understanding of the nature and objects of the invention, reference should be had to the following examples which are given merely to illustrate the invention and are not to be construed in a limiting sense, all parts being given by weight unless otherwise indicated:

Example 1

About 10.5 pounds of ethyl cellulose (viscosity 250 cp. at 25° C., ethoxy content 47%) and 1.5 pounds of solid polyvinyl formal are placed in 3 gallons of ethyl alcohol and allowed to soak therein overnight. At the end of that period the ethyl cellulose and the polyvinyl formal will have completely absorbed the alcohol to provide a jelly-like mass. Then to this jelly-like mass are added 12.4 pounds of plasticizer consisting of 5 pounds of intermediate resin reaction product of formaldehyde and cardanol and 7.4 pounds of a chlorinated diphenyl. The plasticizer is mixed with said jelly-like mass in a dough mixer. This mixture is then placed on a luke warm rolling mill and open milled thereon until a uniform, homogeneous dough-like mass is produced. Then one roll of said mill is slowly heated until its temperature corresponds to 90 pounds steam pressure. Said dough-like mass is milled thereon in the course of heating said one roll and for some time thereafter which may be about 15 minutes. Milling is continued and the second roll is similarly heated in the same manner. This milling between the hot rolls is continued until all of the alcohol has been evaporated from the mass and by this time the solution between the ethyl cellulose, the vinyl butyral and the plasticizer has been complete. The mill is cooled down slowly and the resultant mass which is tough and leathery, is taken off the mill and cut into strips about 14" wide. The time of milling is about 1.5 hours and the melting point of this resultant mass is about 375° F.

Example 2

A clean dough mixer is charged with 30 pounds of denatured alcohol and 30 pounds of technical ethylacetate. 8 pounds of liquid polymerized cashew nut shell liquid and 13.5 pounds of a chlorinated diphenyl are added and stirred until complete solution takes place. Then about 17 pounds of ethyl cellulose (viscosity of 200 centipoises at 25° C. and ethoxy content of 46%) and 2 pounds of benzyl cellulose and 1 pound of solid polyvinyl butyral are added to said solution with continuous stirring. Mixing in dough mixer is continued at room temperature (25° C.) until a clear uniform and homogeneous mass is obtained. This homogeneous mass is then milled on hot rolls at temperatures between 280° F. to 300° F. Milling is continued until all solvent is evaporated. For a batch of this size, the time should be not less than 45 minutes. The rolls are then cooled until the mass can be cleanly sheeted from the mill. The resultant mass is tough and leathery and sheeted off the mill in sheets approximately ¼" thick.

Example 3

A clean dough mixer is charged with solvent consisting of 30 pounds of denatured ethyl alcohol and 30 pounds of technical grade ethyl acetate. Then 7.2 pounds of cardanol-formaldehyde reaction product and 12 pounds of a chlorinated diphenyl are added and stirred until completely dissolved in said solvent. Then 4 pounds of solid polymerized vinyl butyral is added with continuous stirring and then 20 pounds of ethyl cellulose (ethoxy content of 46% and a viscosity of 200 centipoises at 25° C.) is added. Mixing in the dough mixer is continued at room temperature (25° C.) until a clear uniform and homogeneous mass is obtained. This clear homogeneous mass is then placed on a differential speed roll rubber mill and milled on the rolls which are maintained at a temperature of 280° F. to 300° F. Milling is continued until all the solvent has evaporated therefrom. Then the rolls are cooled until the product can be cleanly sheeted off of the rolls in thickness of about ¼ inch.

Example 4

About 20 pounds of solid polyvinyl butyral, 3 pounds of phosphate of homologue of cresol (Dow No. 5 plasticizer), 3 pounds of polymerized cardanol acetate and 3 ounces of zinc stearate are mixed together by hand stirring and then milled on hot rolls at a temperature between about 240–280° F. until a uniform and homogeneous dispersion or solution is obtained. The rolls are then cooled until the mass can be removed cleanly from the mill and this resultant product is removed from said mill in sheets approximately ¼ inch thick.

Example 5

About 15 pounds of vinyl butyral, two pounds of ethyl cellulose (47% ethoxy content) and 3 pounds of phosphate homologue of cresol (Dow No. 5 plasticizer), 3 pounds of cardanol acetate and 5 ounces of zinc stearate are mixed together by hand stirring. Thereafter this mixture is placed on a rubber mill whose rolls are maintained at a temperature of about 240° F. to about 280° F. and are milled therebetween until a homogeneous and uniform mass is obtained. The rolls are cooled and the mass which is now a tough, leathery, homogeneous composition is removed from the mill in a sheet approximately ¼" thick.

Example 6

About 15 pounds of vinyl butyral, two pounds of ethyl cellulose (47% ethoxy content) and 8.5 pounds of tricresyl phosphate are mixed together by hand stirring. Thereafter this mixture is placed on a rubber mill whose rolls are maintained at a temperature of about 240° F. to about 280° F. and are milled therebetween until a homogeneous and uniform mass is obtained. The rolls are cooled and the mass which is now a tough, leathery, homogeneous composition is removed from the mill in a sheet of approximately ¼ inch thick.

The tough leathery product obtained by following the methods set forth in Examples 1 to 6 inclusive are capable of being macerated or being ground into small pieces. Each of said products either in the form of small pieces or of a long tape may be fed into an extruding device. This extruding device may include an extruding worm feeding into a die head and in the course of feeding any one of said products thereto, the temperature of the extruding worm is preferably 250° F. at the feed end thereof to about 320° F. at the die head which is also at about 320° F. In the course of being fed by this heated worm fed through the heated die head, each of said products in its travel therethrough becomes softened to such a degree that it may readily be extruded through the die head as a coating and insulating material on an electrical conductor which is concentrically disposed with respect to the outer periphery of the insulator or disposed longitudinally therein through the center thereof. Thereafter this electrical conductor with said insulating material may be passed through a water trough, is sprayed with water or in some other manner is subjected to a heat transfer medium to chill the same to room temperature. Before chilling said insulator clad conductor, if a gloss is desired on the outer surface of the insulation material, the same may be subjected to a very high temperature for an extremely short period of time to somewhat fuse only the outer skin thereof. For this purpose the clad conductor may be passed through a muffle furnace maintained at a temperature between 500° F. and 600° F. in order to provide a sharp and fast increase in temperature at only the outer surface thereof, then the so-treated conductor may be passed through a water bath or in some other manner chilled rapidly. This insulated conductor which may or may not have been gloss surfaced is oven cured to increase its heat resistance by maintaining the same for between about 5 to 30 hours at a temperature of between about 200° F. to about 300° F.

By following the teachings herein, there may be provided insulated conductors for the ignition systems of airplanes. These insulated conductors when employed as elements of airplane ignition systems serve well at altitudes at which rubber, neoprene and the like have failed because the airplane ignition system insulated electrical conductors embodying this invention have high corona resistance, heat resistance and carbon tracking resistance characteristics. These insulated conductors are flexible, tough and non-brittle.

Since certain changes may be made in this invention without departing from the scope thereof, it is intended that all matter contained in the above description shall be interpreted as illustrative and not in a limiting sense.

Having thus described my invention, what I claim and desire to protect by Letters Patent is:

1. The method for producing an airplane motor ignition system conductor comprising converting to a leathery mass a mixture of an ether selected from the group consisting of benzyl cellulose and alkyl ethers of cellulose and a solid polymer selected from the group consisting of vinyl formal, vinyl butyral and vinyl acetal and a plasticizer for both said ether and said polymer in the presence of each other, said plasticizer being incapable of being materially distilled over at temperatures as high as 200° C., extruding said leathery mass, modified under the application of heat, onto a conductor and then curing said insulated conductor, for a period of about 5 to 30 hours at temperature between about 200° F. to 300° F.

2. The method for producing an airplane motor ignition system conductor comprising converting to a leathery mass a mixture of ethyl cellulose and a solid polymer selected from the group consisting of vinyl formal, vinyl butyral and vinyl acetal and a plasticizer for both said ethyl cellulose and said polymer in the presence of each other, said plasticizer being incapable of being materially distilled over at temperatures as high as 200° C. extruding said leathery mass, modified under the application of heat, onto a conductor and then curing said insulated conductor, for a period of about 5 to 30 hours at temperature between about 200° F. to 300° F.

3. The method for producing an airplane motor ignition system conductor comprising converting to a leathery mass a mixture of ethyl cellulose vinyl butyral and a plasticizer for both said ethyl cellulose and said vinyl butyral in the presence of each other, said plasticizer being incapable of being materially distilled over at temperatures as high as 200° C., extruding said leathery mass, modified under the application of heat onto a conductor and then curing said insulated conductor, for a period of about 5 to 30 hours at temperature between about 200° F. to 300° F.

MORTIMER T. HARVEY.

REFERENCES CITED

The following references are of record in the file of this patent:

UNITED STATES PATENTS

| Number | Name | Date |
| --- | --- | --- |
| 2,085,995 | Patnode et al. | July 6, 1937 |
| 2,217,451 | Patnode | Oct. 8, 1940 |
| 2,249,280 | Koch | July 15, 1941 |
| 2,257,104 | Burrows et al. | Sept. 30, 1941 |
| 2,332,538 | Smith | Oct. 26, 1943 |

OTHER REFERENCES

Matiello, "Protective and Decorative Coatings," New York, John Wiley and Sons, 1941, vol. 1, page 99.